United States Patent [19]

Lapeyre

[11] Patent Number: 4,688,670
[45] Date of Patent: Aug. 25, 1987

[54] FLAT TOP CONVEYOR BELT

[75] Inventor: James M. Lapeyre, New Orleans, La.

[73] Assignee: The Laitram Corporation, New Orleans, La.

[21] Appl. No.: 724,501

[22] Filed: Apr. 18, 1985

Related U.S. Application Data

[63] Continuation of Ser. No. 421,057, Sep. 22, 1982, abandoned.

[51] Int. Cl.⁴ .............................................. B65G 17/06
[52] U.S. Cl. .................................................. 198/853
[58] Field of Search ................ 198/853, 851, 850, 852

[56] References Cited

U.S. PATENT DOCUMENTS

| | | | |
|---|---|---|---|
| 506,456 | 10/1893 | Adt | 198/853 |
| 1,160,057 | 11/1915 | Ensign | 198/853 X |
| 2,681,728 | 6/1954 | Boron | 198/851 |
| 3,672,488 | 6/1972 | Collins | 198/853 X |

FOREIGN PATENT DOCUMENTS 2144290 2/1973 Fed. Rep. of Germany ...... 198/853

Primary Examiner—Joseph E. Valenza
Assistant Examiner—D. Glenn Dayoan
Attorney, Agent, or Firm—Weingarten, Schurgin, Gagnebin & Hayes

[57] ABSTRACT

A conveyor belt composed of interconnected like modules of integral molded construction. Each of the modules has a flat conveying surface and first and second link ends spaced along the width of the module, each of the link ends including segments having circular bores aligned on a pivot axis across the width of the module and which segments are operative to provide a pivot bearing surface, and to cover a pivot rod on the conveying side of the module, the pivot rod remaining substantially exposed on the bottom side of the module for inspection and cleaning and for more uniform temperature cycling.

12 Claims, 10 Drawing Figures

FIG. 9  FIG. 10

FLAT TOP CONVEYOR BELT

This application is a continuation of application Ser. No. 421,057, filed Sept. 22, 1982 abandoned.

FIELD OF THE INVENTION

This invention relates to conveyor belts and modules for the construction thereof, and more particularly to a modular conveyor belt comprising interconnected modules of the same integral construction.

BACKGROUND OF THE INVENTION

Modular conveyor belts are known which comprise modules pivotally connected to one another, each module being molded as a single unit, preferably of a plastic material. Such conveyor belts are shown, for example, in U.S. Pat. Nos. 3,870,141 and 4,051,949 of the same inventor and assignee as herein. For some purposes, as in the food industry, it is desirable that the conveyor be readily inspected to assure cleanliness. Government and industry regulations also specify standards of inspectability and cleanliness for equipment used in processing products for human consumption. An easily inspectable conveyor belt is shown in U.S. Pat. No. 4,159,763 of The Laitram Corporation, the assignee herein.

SUMMARY OF THE INVENTION

In accordance with this invention, a conveyor belt is provided which includes modules of integral molded construction each having a flat conveying surface and first and second link ends spaced along the width of the module. Each of the link ends includes meshable segments each having a pivotal bore aligned on a pivot axis across the width of the module, and which are operative to cover a pivot rod on the top or conveying side of the module, rendering that side substantially flat and cleanable, the pivot rods remaining substantially exposed on the bottom or reverse side for inspection and cleaning. The rod is exposed to ambient temperature and is therefore more easily heated or cooled than a concealed pivot rod, such that during temperature cycling, thermal expansion and contraction is more uniform for the modules and interconnecting rods. Longitudinal ribs are provided on the underside of the module body terminating at the link ends, these ribs having enclosed end portions circumscribing an opening centered on the pivot axis. Transverse ribs extend across the width of the module, and longitudinal ribs are spaced between the transverse ribs. With the interconnected modules lying on a straight path, the linked ends are concealed, and the belt provides an effectively continuous conveying surface. Along a curved path, the linked ends are exposed for inspection and cleaning.

Sprocket recesses are provided on each module by confronting surface of the transverse ribs and are disposed midway between the pivot axes of the module. The sprocket recesses are adapted to mate with corresponding sprocket teeth of an associated sprocket wheel to provide a centrally driven conveyor module which exhibits minimal chordal action and scrubbing between the mating surfaces of the module and the sprocket wheel.

DESCRIPTION OF THE DRAWINGS

The invention will be more fully understood from the following detailed description taken in conjunction with the accompanying drawings, in which:

FIG. 9 is an elevation view of a sprocket wheel employed with the linked modules; and FIG. 10 is a sectional end view of the sprocket wheel of FIG. 9.

DETAILED DESCRIPTION OF THE INVENTION

Figure 1:
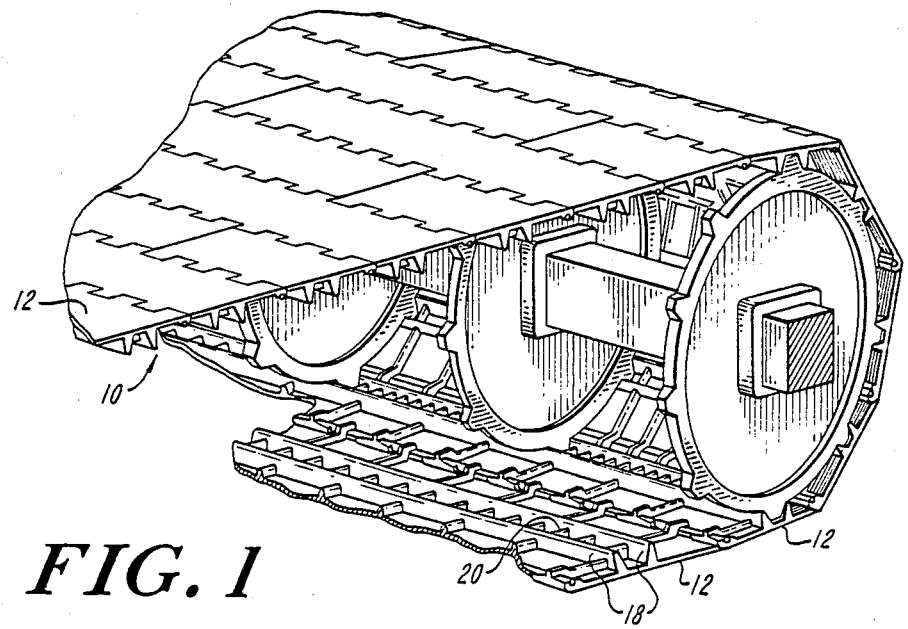
FIG. 1 is a pictorial view of the novel conveyor belt and associated sprocket drive.

Referring to FIGS. 1-6 of the drawing, there is shown a module 10 which, is interconnected with like modules to produce a modular linked conveyor belt in accordance with the invention. Each module 10 is formed as an integral unitary structure of plastic material by well-known injection molding or other molding process. Each module includes a generally rectangular plate-like body 12 having a first plurality of link ends 14 and a second plurality of link ends 16. A pair of transverse ribs 18 extend across the width of the body, and a plurality of longitudinally disposed ribs 20 are spaced between the transverse ribs 18. A plurality of longitudinal ribs 22 also extend from each transverse rib 18 toward and terminate at the respective link ends. The grid structure formed by the transverse ribs 18 and the interconnecting longitudinal ribs 20 and 22 serves to strengthen the module and to prevent any significant bending of the module about its longitudinal or transverse axes. The link ends 14 and 16 each have upper surface portions 24 (FIG. 3) coplanar with the upper conveyor surface 26 of the body 12, and an end portion 28 which downwardly extends from the surface and which defines a partially cylindrical segment. For each link end, the partially cylindrical segments are aligned about a common transverse axis which is the pivot axis of adjacent interconnected links. The longitudinal ribs 22 which terminate at each link end include enclosed end portions 30 which circumscribe a pivotal bore 31 therethrough which is in alignment with the pivot axis and through which a pivot rod 32 extends to interconnect mated links. The pivot rods 32 are typically headed or otherwise deformed at their ends for axial retention in the module.

The end portions 28 each include a partial interior cylindrical surface or bore 33 which bears on the pivot rod 32 and which provides sufficient bearing surface area to accommodate the tensile forces produced by driving of the interconnected modules along a conveyor path under load. The edges 34 of the module which confront the link ends 28 of a mated module are bevelled to closely abut the rounded edges of the link ends 28, and to provide only a small gap between mated links and maintain a substantially continuous conveying surface when mated links are disposed along a straight path, as seen in FIG. 1. Preferably, the modules are of link end configuration to be end-to-end reversible; that is, either end of a module can mate with either end of any other link module.

Figure 2:
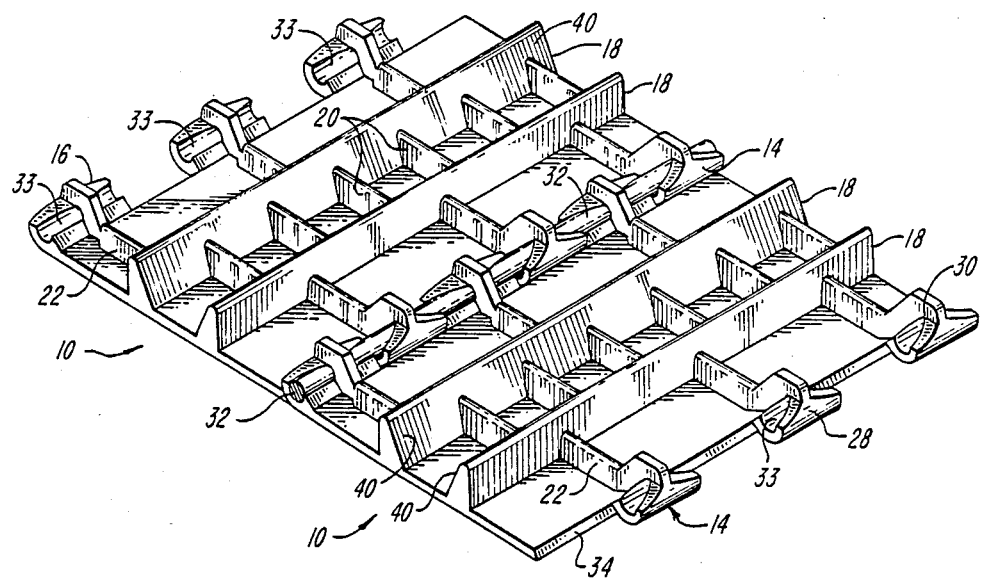
FIG. 2 is a pictorial view of the bottom side of linked modules.
Figure 3:
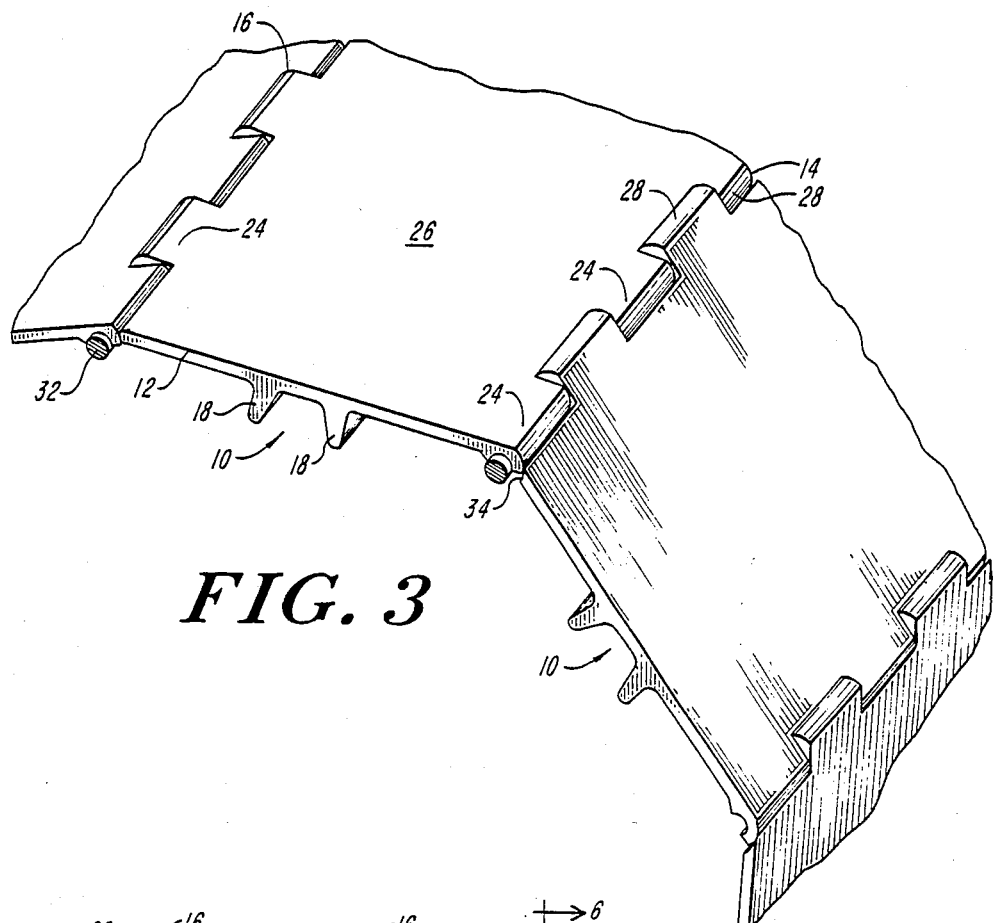
FIG. 3 is a top pictorial view of linked modules.
Figure 4:
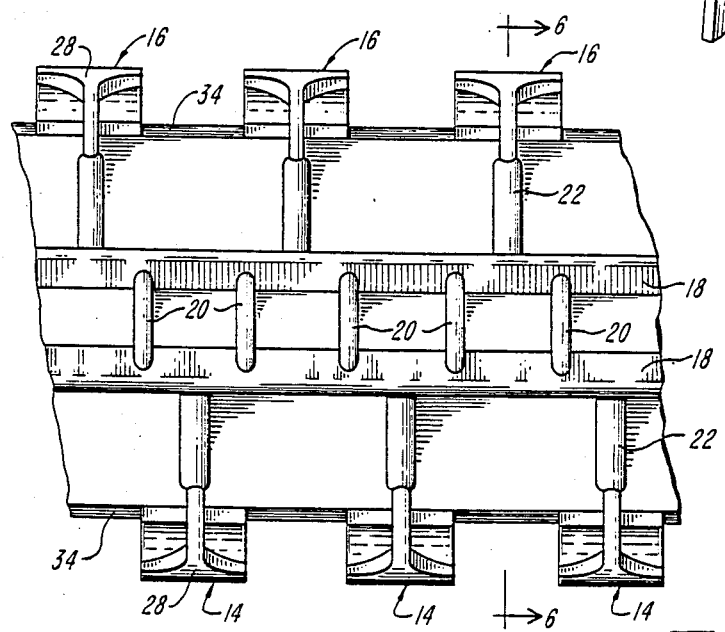
FIG. 4 is a partial bottom view of a module.
Figure 5:
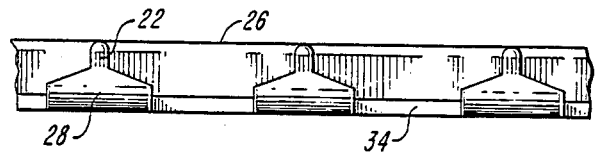
FIG. 5 is a partial end elevation view of a module.
Figure 6:
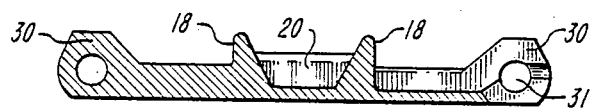
FIG. 6 is a sectional elevation view taken along lines 6—6 of FIG. 4.
Figure 8:
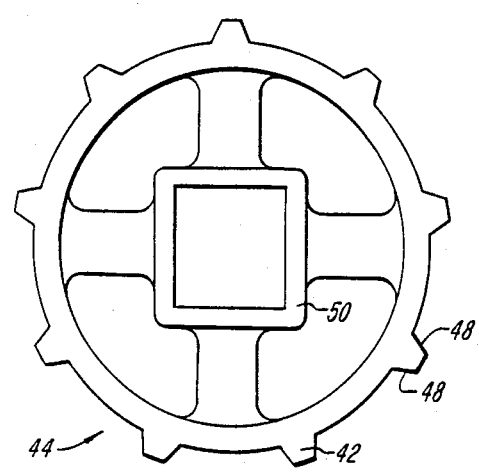
FIG. 8 is a cutaway side elevation view illustrating linked modules in engagement with a sprocket wheel.
Figure 8:
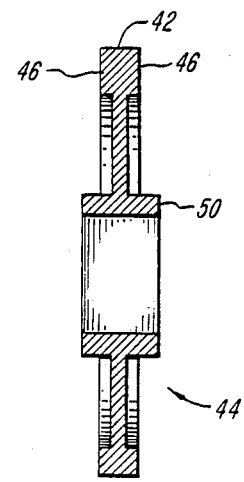
Figure 8:
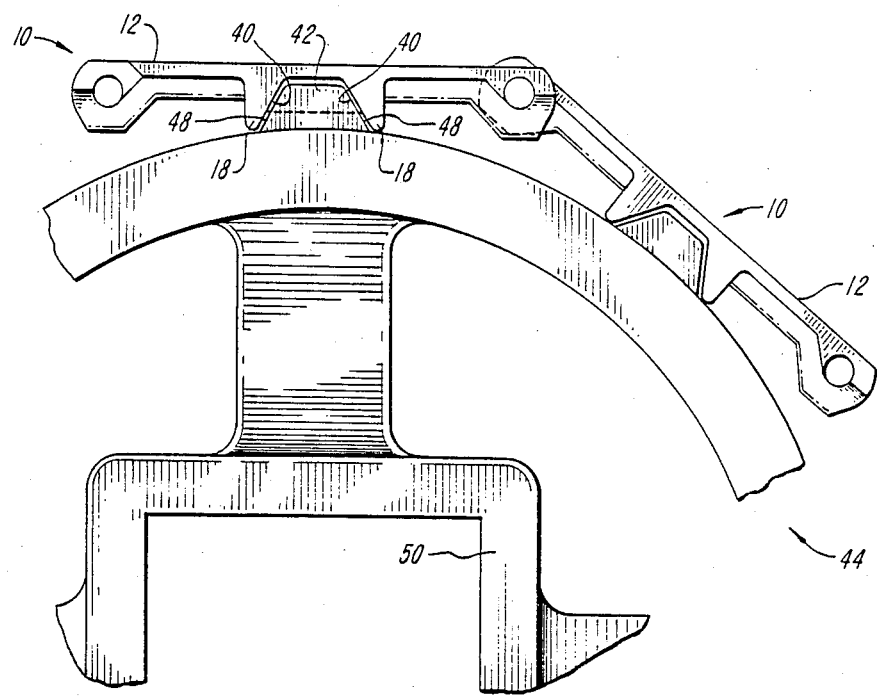

Along a straight path, the mated modules each have an upper conveying surface 26 which is substantially coplanar and continuous with that of adjacent links to provide an effectively continuous and easily cleaned conveying surface with only a small parting line between adjacent modules. The pivot rods 32 joining adjacent modules is covered by the end portions 28. The pivot rod 32 is substantially exposed on the inner side of the links, as seen in FIG. 2, to provide visual access to the pivot rods and link ends for inspection and cleaning as required by industrial and governmental regulations, for example, in the food industry. The link ends and edges of each module are also exposed for ease of inspection when the belt is conveyed in a circular path around an associated sprocket, as shown in FIGS. 3 and 8.

Confronting inclined surfaces 40 of the transverse ribs 18 define recesses which serve as sprocket recesses located midway between the pivot axes of the module. These sprocket recesses are adapted to mate with corresponding sprocket teeth 42 of an associated sprocket wheel 44, as shown in FIGS. 1 and 8. The sprocket wheel 44 is shown in FIGS. 9 and 10 and has teeth 42 with parallel side surfaces 46 and inclined front and back surfaces 48 configured to engage the corresponding surfaces of the sprocket recesses. The sprocket wheel 44 has a hub 50 adapted to be secured to a square shaft. A sufficient plurality of sprocket wheels is employed across the width of the module to provide intended support and driving force, as shown in FIG. 1. The centrally driven sprocket recesses provide the benefits of minimizing chordal action and scrubbing between the mating surfaces of the module and the sprocket wheel.

The centrally disposed sprocket recesses are shown as part of a module of different construction is copending application Ser. No. 179,523 of the same inventor as herein. The sprocket recesses can be considered as the inverse of the center sprocket teeth shown in copending application Ser. No. 228,154 also of the same inventor as herein. The placement of the sprocket recesses midway between the pivot axes, and the driving of the modules at this midposition, rather than driving the modules at the position of the pivot axes as is conventionally done, provides substantially constant speed drive of the conveyor belt, substantially eliminates sprocket-to-belt wear, the provides a belt capable of faster running speeds than conventional belts by reason of minimized chordal action and scrubbing. The confronting angled surfaces of the intermediate recesses also serves to present greater surface area to water and/or steam jets which can be located above and below the modules for cleaning of the belt. The angled sections also facilitate visual inspection of the belt.

Figure 7:
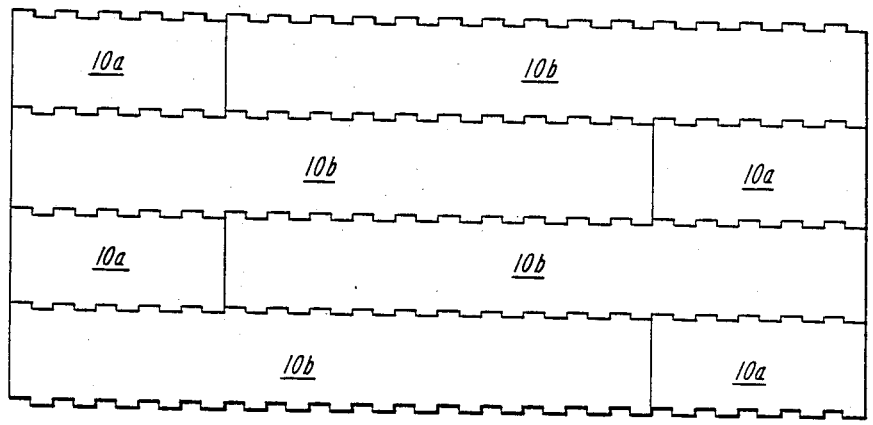
FIG. 7 is a top view of modules linked in brick-laid fashion.

The modules are preferably made in widths which are multiples of the smallest module width so that modules can be arranged in brick-laid fashion to provide a conveyor belt of any desired overall width. Referring to FIG. 7, the illustrated belt is composed of modules 10a of a small width, and modules 10b of a greater width which is triple the smaller width. The modules are staggered as shown such that laterally adjacent modules are straddled by a single module to achieve lateral interlocking of the belt. The modules may be easily cut to any intermediate widths such that belts of any width can be manufactured from a single standard art.

The modules are fabricated as an integral unitary structure by injection molding of a plastic material such as polyethylene. The particular plastic material is determined in accordance with the characteristics desired to suit a particular operating environment. The pivot rods are typically of the same or compatible plastic material.

The invention is not to be limited as indicated in the appended claims.

What is claimed is:

1. A modular conveyor belt composed of a plurality of modules, each comprising:

an integrally formed body having a flat conveying surface and link ends of identical construction, said link ends each projecting beyond, and spaced along, two opposite parallel edges of the body and in such a way that the link ends on the opposite edges of the body are end-to-end reversible;

each link end possessing an upper surface coplanar and integral with the conveying surface, and an end portion extending downward from an integral with the surface and defining a partial cylinder aligned on a pivot axis across the width of the body;

each link end being adapted to mate with link ends of adjacent modules, and pivotally connected thereto by pivot rods extending along the pivot axis across the width of the connected modules;

the link ends having first structural portions integral with the body being operative to substantially cover the pivot rods on the conveying side of the module, and having second structural portions cooperative with said first structural portions both to substantially expose portions of the pivot rods on the bottom side of the module which are not covered by said second structural portions for inspection and cleaning and more uniform temperature cycling and to encircle a minor portion of the exposed pivot rods on the bottom of the module sufficient to provide pivotal bearing races;

the end portion of each link end being substantially exposed on the conveying side of the module for inspection and cleaning as the conveyor belt is carried over a curved course.

2. The conveyor belt of claim 1 wherein the link ends each include a bearing surface which bears on the pivot rod and which provides sufficient bearing surface to accommodate the tensile forces produced by driving the interconnected modules along a conveyor path.

3. A conveyor belt composed of a plurality of like modules pivotally interconnected by pivot rods, each of the modules comprising:

an integral body having a flat conveying surface and link ends spaced along and projecting beyond two opposite parallel edges in such a way that the link ends on the opposite edges of the body are end-to-end reversible;

each link end possessing an upper surface coplanar with the conveying surface, and an end portion extending downward from the surface and defining a partial cylinder aligned on a pivot axis across the width of the body;

the link ends having first structural portions being operative to cover pivot rods on the conveying side of the module;

the link ends having second structural portions each having a narrower width than said first structural portion to expose portions of the pivot rods on the underside of the module which are not covered by said second structural portions to provide access to the pivot rods for inspection and cleaning, and more uniform temperature cycling;

the link ends each having end portions being substantially exposed to the conveying side of the module for inspection and cleaning as the conveyor belt is carried over a curved course;

the body of each module having bevelled edges between the link ends, which closely abut the link ends of connecting modules;

a plurality of transverse ribs extending across the width of the body and disposed outward from the inner side of the body;

a plurality of first longitudinally disposed ribs spaced between the transverse ribs; and a plurality of second longitudinal ribs extending from each transverse rib toward the respective link ends, each of the second longitudinal ribs terminating at a respective link end at said end portion to circumscribe a pivotal bore which is in alignment with the pivot axis and cooperative with the second structural portions to encircle a minor portion of the exposed pivot rods coextensive with each link end and on the bottom of the module.

4. The conveyor belt of claim 3 wherein interconnected modules lying along a straight path define an effectively continuous conveying surface.

5. The conveyor belt of claim 3 wherein said conveying surface is a surface of a plate-like portion of the integral body.

6. The conveyor belt of claim 3 wherein interconnected modules lying along a straight path have the link ends and bevelled edges concealed.

7. The conveyor belt of claim 3 wherein said transverse ribs comprise a pair of transverse ribs extending across the width of the body and having confronting inclined surfaces which define a sprocket recess located midway between the pivot axes of the module and adapted to mate with corresponding sprocket teeth of an associated sprocket wheel.

8. The conveyor belt of claim 7 wherein the inclined surfaces are angularly inclined from the conveying surface toward respective link ends.

9. The conveyor belt of claim 3 wherein the partial cylinders of the link ends each include a cylindrical surface adapted to bear on a pivot rod retaining connected modules, the cylindrical surface providing sufficient bearing surface area to accommodate the tensile forces produced by driving of the interconnected modules along a conveyor path.

10. A conveyor comprising:
a conveyor belt composed of a plurality of like modules pivotally interconnected by pivot rods, each of the modules further comprising:
an integral body having a flat conveying surface and link ends placed along and projecting beyond two opposite parallel edges in such a way that the link ends on the opposite edges of the body are end-to-end reversible;
each link end possessing an upper surface coplanar with the conveying surface, and an end portion extending downward from the surface and defining a partial cylinder aligned on a pivot axis across the width of the body;
the link portions of the link ends having first structural portions being operative to cover pivot ends on the conveying side of the module;
the end portions of the link ends having second structural portions each having a narrower width than said first structural portion to expose portions of the pivot rods on the underside of the module which are not covered by said second structural portions to provide access to the pivot rods for inspection and cleaning, and more uniform temperature cycling;

the end portion of each link being substantially exposed on the conveying side of the module for inspection and cleaning as the conveyor belt is carried over a curved course;

the body of each module having bevelled edges between the link ends, which closely but the link ends of connecting modules;

a pair of transverse ribs extending across the width of the body and having confronting inclined surfaces which define a sprocket recess located midway between the pivot axes of the module and adapted to mate with corresponding sprocket teeth of an associated sprocket wheel;

a plurality of first longitudinally disposed ribs spaced between the transverse ribs; and a plurality of second longitudinal ribs extending from each transverse rib toward the respective link ends, each of the second longitudinal ribs terminating at a respective link end in an enclosed end portion cooperative with the second structural portions so as to circumscribe a pivotal bore which is in alignment with the pivot axis while covering a minor portion of the substantially exposed pivot rods;

a plurality of sprocket wheels having sprocket teeth adapted to mate with said sprocket recesses and so spaced on the sprocket wheels as to mesh with the sprocket recesses of successive conveyor belt modules; and means, associated with said sprocket wheels, for supporting and driving said sprocket wheels and conveyor belt.

11. A conveyor belt module, comprising:
an integrally formed body having a flat conveying surface and link ends spaced along and projecting beyond two opposite parallel edges in such a way that the link ends on the opposite edges of the body are end-to-end reversible;
each link end possessing an upper surface coplanar with the conveying surface, and an end portion extending downward from the surface and defining a partial cylinder aligned on a pivot axis across the width of the body;
each link end being adapted to mate with link ends of adjacent modules, and pivotally connected thereto by pivot rods extending along the pivot axis across the width of the connected modules;
the end portions of the link ends having first structural portions being operative to substantially cover the pivot rods on the conveying side of the module, and having second structural portions being cooperative with said first structural portions both to substantially expose portions of the pivot rods on the bottom of the module. which are not covered by said second structural portions for inspection and cleaning and more uniform temperature cycling and to encircle a minor portion of the substantially exposed pivot rods to define pivot rod bearing races;
the end portion of each link end being substantially exposed on the conveying side of the module for inspection and cleaning as the conveyor belt is carried over a curved course.

12. The conveyor belt of claim 1, wherein each of said modules has a preselected transverse dimension selected to be a non-zero integral multiple of a predetermined nominal transverse dimension so that modules can be arranged in brick-layed fashion to provide a belt of any desired transverse dimension.

* * * * *